(12) United States Patent
Kim

(10) Patent No.: US 12,252,013 B2
(45) Date of Patent: Mar. 18, 2025

(54) CONTROL SYSTEM OF SMART GLASS FOR VEHICLE

(71) Applicants: Hyundai Motor Company, Seoul (KR); Kia Corporation, Seoul (KR)

(72) Inventor: Ki-Eun Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 330 days.

(21) Appl. No.: 17/886,260

(22) Filed: Aug. 11, 2022

(65) Prior Publication Data

US 2023/0127726 A1   Apr. 27, 2023

(30) Foreign Application Priority Data

Oct. 22, 2021   (KR) .......................... 10-2021-0141757

(51) Int. Cl.
| | |
|---|---|
| B60K 35/00 | (2024.01) |
| B60J 3/04 | (2006.01) |
| B60K 35/10 | (2024.01) |
| B60K 35/28 | (2024.01) |
| B60K 35/60 | (2024.01) |
| B60K 35/80 | (2024.01) |

(52) U.S. Cl.
CPC ................ *B60K 35/00* (2013.01); *B60J 3/04* (2013.01); *B60K 35/10* (2024.01); *B60K 35/28* (2024.01); *B60K 35/60* (2024.01); *B60K 35/80* (2024.01); *B60K 2360/139* (2024.01); *B60K 2360/165* (2024.01); *B60K 2360/166* (2024.01); *B60K 2360/176* (2024.01); *B60K 2360/21* (2024.01); *B60K 2360/566* (2024.01); *B60K 2360/573* (2024.01); *B60K 2360/785* (2024.01)

(58) Field of Classification Search
CPC ........ B60K 35/00; B60K 35/10; B60K 35/28; B60K 35/60; B60K 35/80; B60K 2360/139; B60K 2360/165; B60K 2360/166; B60K 2360/176; B60K 2360/21; B60K 2360/566; B60K 2360/573; B60K 2360/785; B60K 35/22; B60J 3/04; B60R 11/0229; B60R 11/04; B60R 16/023; B60R 25/10; E05B 77/26
See application file for complete search history.

(56) References Cited

U.S. PATENT DOCUMENTS

| | | | |
|---|---|---|---|
| 9,733,467 B2 * | 8/2017 | Kim | ........................ G02B 1/005 |
| 10,496,220 B2 * | 12/2019 | Cho | ...................... H04N 23/635 |
| 2010/0285280 A1 | 11/2010 | Yonekura et al. | |

(Continued)

FOREIGN PATENT DOCUMENTS

KR   10-2010-0097227 A   9/2010

*Primary Examiner* — Mussa A Shaawat
(74) *Attorney, Agent, or Firm* — Morgan, Lewis & Bockius LLP

(57) ABSTRACT

A control system of a smart glass for a vehicle, which changes a transmittance and displays an image, includes the smart glass provided on a glass of the vehicle and having a changed transmittance or an image displayed thereon; an operation member into which a mode of the smart glass is input; and a control unit electrically connected to the smart glass and the operation member and configured to adjust the transmittance of the smart glass according to the mode input into the operation member, or to control the smart glass so that the image is displayed through the smart glass.

15 Claims, 9 Drawing Sheets

(56) References Cited

U.S. PATENT DOCUMENTS

| | | | |
|---|---|---|---|
| 2013/0161971 A1* | 6/2013 | Bugno | B64C 1/1484 296/97.2 |
| 2015/0077235 A1* | 3/2015 | Pisz | G06F 3/017 340/426.23 |
| 2015/0077327 A1* | 3/2015 | Pisz | G06F 3/017 345/7 |
| 2018/0093611 A1* | 4/2018 | Kim | B60K 35/23 |
| 2018/0259804 A1* | 9/2018 | Bae | G02F 1/13306 |
| 2022/0075221 A1* | 3/2022 | Wang | G02F 1/13338 |
| 2022/0086995 A1* | 3/2022 | Wang | G06F 3/0412 |

\* cited by examiner

FIG. 5

```
TRANSFORM SMART GLASS
☐ 1. SMART GLASS OFF
☐ 2. BRIGHTNESS ADJUSTMENT OF SMART GLASS
☐ 3. VEHICLE BRAND/VEHICLE MODEL/VEHICLE IMAGE
☐ 4. STORED IMAGE
☐ 5. VEHICLE OPERATION INFORMATION
☐ 6. NAVIGATION
☐ 7. KIDS MODE
```

CONTROL SYSTEM OF SMART GLASS FOR VEHICLE

CROSS-REFERENCE TO RELATED APPLICATION

The present application claims priority to Korean Patent Application No. 10-2021-0141757, filed on Oct. 22, 2021, the entire contents of which is incorporated herein for all purposes by this reference.

BACKGROUND OF THE PRESENT DISCLOSURE

Field of the Present Disclosure

The present disclosure relates to a glass mounted on a vehicle, and to a control system of a smart glass for a vehicle, which changes a transmittance or displays an image.

Description of Related Art

A window glass, a door glass, etc. for securing a field of vision and lighting are provided on front and rear surfaces, or a door of a vehicle.

To protect privacy and control an amount of sunlight, a tinting film is attached to the window glass or the door glass to adjust the transmittances of the window glass or the door glass.

However, the tinting film has a problem in that transmittance cannot be adjusted after attached. For example, when the transmittance is low, the amount of sunlight may be reduced during the daytime but it is difficult to secure a field of vision at night. Meanwhile, when the transmittance is high, there's too much sunlight during the daytime and it is disadvantageous to protect privacy.

Furthermore, the tinting film simply has only a function of adjusting the transmittance, and therefore, the information cannot be displayed using the window glass or the door glass.

Meanwhile, in case of getting on the vehicle with a child, there was no contents suitable for the child in the vehicle, and therefore, the child had discomfort due to the movement for a long time, and the condition of the child seated on the second row seat or the subsequent rows seat was not easily checked from the first row seat.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control system of a smart glass for a vehicle, which changes a transmittance of a glass of a vehicle, or displays an image on the glass.

A control system of a smart glass for a vehicle according to an exemplary embodiment of the present disclosure for achieving the object includes the smart glass provided on a glass of the vehicle and having a changed transmittance or an image displayed thereon; an operation member into which a mode of the smart glass is input; and a control unit electrically connected to the smart glass and the operation member and configured to adjust the transmittance of the smart glass according to the mode input into the operation member, or to control the smart glass so that the image is displayed through the smart glass.

The mode is any one of a) an off mode in which the smart glass is not operated; b) a variable transmittance mode in which the transmittance of the smart glass is adjusted; c) an image mode in which a pre-stored image is displayed through the smart glass; d) an traveling information mode in which traveling information of the vehicle is displayed through the smart glass; and e) a kids mode in which the pre-stored image is displayed through the smart glass while adjusting the transmittance of the smart glass.

The operation member is an instrument cluster of the vehicle to which a user setting mode (USM) is applied.

The operation member is a communication terminal connected to the vehicle with a connected vehicle service.

The operation member is a display unit provided in the vehicle.

The operation member is a smart key of the vehicle including a display embedded therein to control a state of the vehicle at a location spaced from the vehicle in the mode selected by the user.

In the variable transmittance mode, the transmittance is adjusted by the control unit for each region selected on the smart glass.

In the variable transmittance mode, the transmittance is sequentially changed by the control unit with respect to a predetermined direction on the smart glass.

When the mode is selected as the kids mode, the control unit is configured to operate a child lock provided on a door of the vehicle in a locking state.

When the mode is selected as the kids mode, the control unit is configured to control a camera provided in the vehicle to capture a passenger accommodated on a rear seat of the vehicle, and displays an appearance of the passenger on the rear seat captured by the camera through a display unit provided in the vehicle.

The smart glass is applied to a door glass provided on a door of the vehicle.

The smart glass is applied to a door glass of a rear seat door of the vehicle.

According to the control system and the method of controlling the smart glass for the vehicle according to an exemplary embodiment of the present disclosure having the above configuration, it is possible to change the transmittance of the glass provided on the vehicle or display the image using the user setting mode (USM) or the application of the terminal.

By changing the transmittance of the glass, it is possible to adjust the transmittance of the glass with the transmittance of the situation or the state desired by the user.

Furthermore, it is possible to display the desired image on the glass, obtaining the advertisement effect, the aesthetic effect, or sharing the vehicle traveling information.

Furthermore, it is possible to conveniently adjust the transmittance of the glass, or to change the image to be displayed on the glass through the USM or the application.

Meanwhile, by enabling the image to be displayed on the glass to be the image suitable for the child and to be interlocked with the camera and the display of the AVN provided in the vehicle, it is possible to implement the kids mode. By implementing the kids mode, it is possible to remove the inconvenience felt by the child upon long distance traveling and to easily observe the child's condition even without turning the head back in the first row.

The methods and apparatuses of the present disclosure have other features and advantages which will be apparent

BRIEF DESCRIPTION OF THE DRAWINGS

FIG. 5 is a schematic diagram showing an example of a mode selection menu in the control system of the smart glass for the vehicle according to an exemplary embodiment of the present disclosure.

Figure 1:
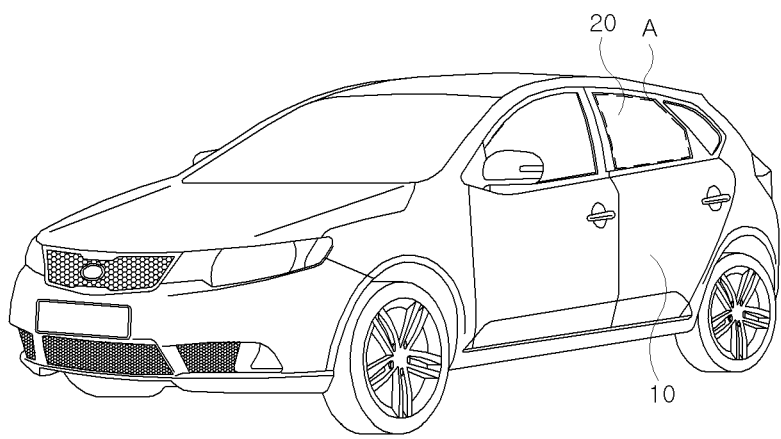
FIG. 1 is a perspective diagram showing an exterior of a vehicle to which a control system of a smart glass for a vehicle according to an exemplary embodiment of the present disclosure is applied.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a control system of a smart glass for a vehicle according to an exemplary embodiment of the present disclosure will be described in detail with reference to the accompanying drawings.

A control system of a smart glass for a vehicle according to an exemplary embodiment of the present disclosure includes a smart glass 20 provided on a glass of a vehicle 1 and having a varying transmittance or an image displayed thereon, an operation member having a mode of the smart glass 20 input by a user, and a control unit 50 configured to control the smart glass 20 to adjust the transmittance of the smart glass 20 depending upon the mode input into the operation member, or to display the image through the smart glass 20.

The smart glass 20 is applied to the glass of the vehicle 1 so that the transmittance is changed or the changeable image is displayed, not a fixed transmittance or an unchangeable image.

The smart glass 20 may be produced in a flexible form and implemented by attaching on the glass to adjust the transmittance or display the image to the glass. Alternatively, the smart glass 20 can also be implemented by producing a display panel in a glass form to mount it on the vehicle.

Meanwhile, the smart glass 20 may be applied to a window glass for securing a field of vision in front of and behind the vehicle 1, a door glass provided on the door 10 of the vehicle 1, and a roof glass provided on a roof of the vehicle 1. Furthermore, it can also be applied to other glasses provided on the vehicle or a mirror.

Figure 2:
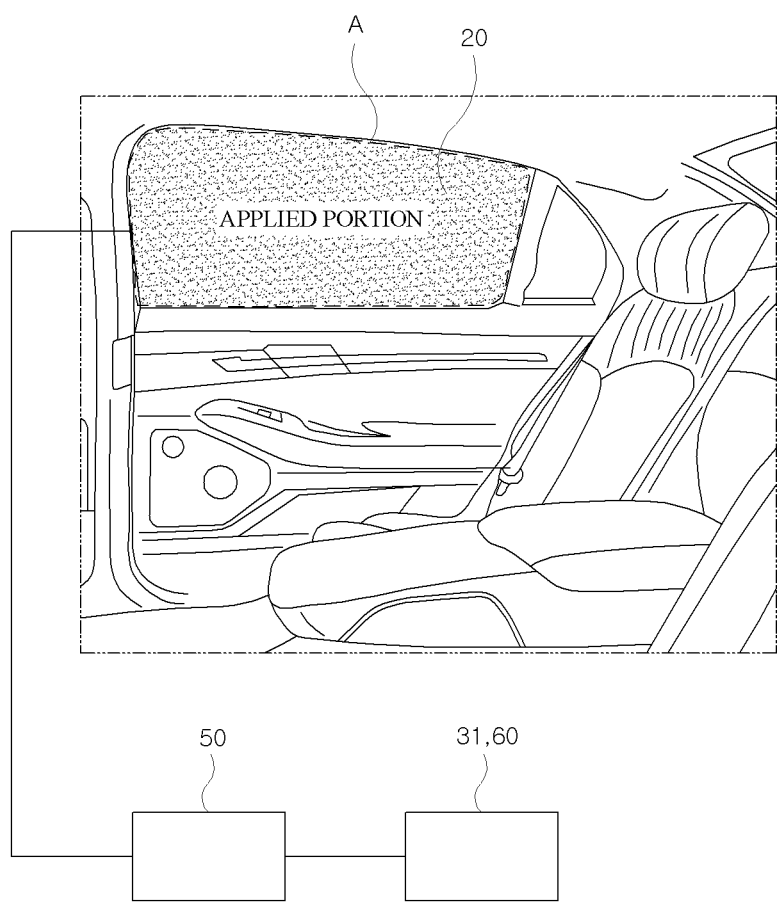
FIG. 2 is a perspective diagram of an interior of the vehicle to which a control system of a smart glass for a vehicle according to an exemplary embodiment of the present disclosure is applied.

Hereinafter, as shown in FIG. 1 and FIG. 2, an example in which the smart glass 20 is applied as the door glass will be described. FIG. 1 and FIG. 2 show an applied portion (A) where the transmittance is changed or the image is displayed.

The operation member is configured so that the mode of the smart glass 20 is input by the user (a driver or a passenger) to select the mode of the smart glass 20.

The control unit 50 controls the smart glass 20 depending upon the user's traveling input from the operation member. Because a logic for controlling the smart glass 20 and the image to be displayed through the smart glass 20 are stored in the control unit 50, the control unit 50 can control the smart glass 20 depending upon the input from the operation member. Because the control unit 50 is connected to an infotainment system, an engine management system (EMS), a vehicle speed sensor, etc. of the vehicle 1, including the operation member and the smart glass 20, the control unit 50 can receive the information to be displayed through the smart glass 20.

Figure 3:
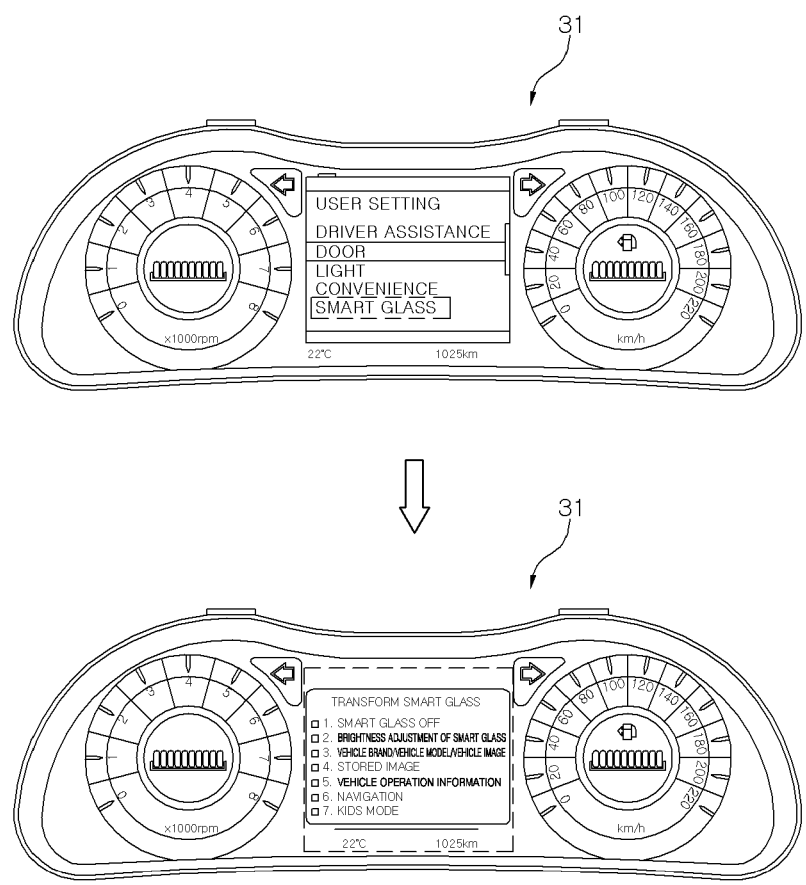
FIG. 3 is a schematic diagram of an instrument cluster in the control system of the smart glass for the vehicle according to an exemplary embodiment of the present disclosure.

Meanwhile, an instrument cluster 31 of the vehicle 1 may be an example of the operation member (see FIG. 3).

The instrument cluster 31 can display various information of the vehicle 1 and have various settings for the vehicle 1 performed by the driver. To perform the settings for the vehicle 1 on the instrument cluster 31, a user setting mode (USM) is applied, and therefore, the mode of the smart glass 20 is selected. When the USM is applied, the menu is selected by a button (e.g., button provided on a steering wheel) provided in the vehicle as the set menu is displayed through the instrument cluster 31, and therefore, the operation mode is selected.

In other words, as shown in FIG. 3, when the menu that sets the smart glass 20 is selected on the instrument cluster 31, it enters a menu for which the mode is selected, and any one of the modes is selected.

A communication terminal 60 connected to the vehicle 1 with a connected vehicle service may be another example of the operation member. Each of the vehicle manufacturers provides the connected vehicle service to perform the starting ON/OFF, door lock/unlock, air conditioning adjustment, etc. of the vehicle 1 using the communication terminal 60 at a remote location through wireless communication with their vehicles, and the communication terminal 60 may be used as the operation member configured to select the operation mode of the smart glass 20.

Figure 4:
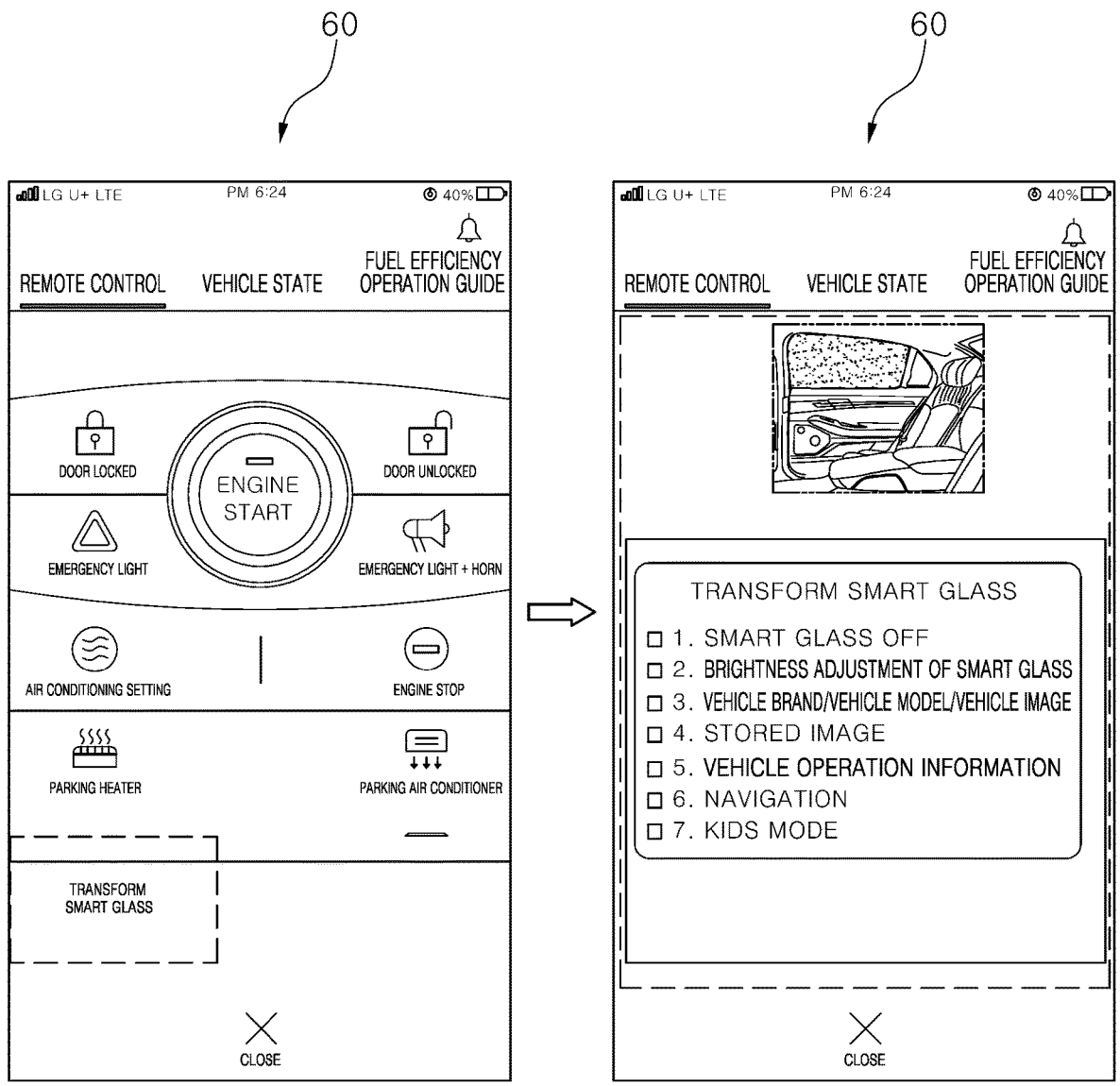
FIG. 4 is a schematic diagram showing a state where an application is driven on the terminal in the control system of the smart glass for the vehicle according to an exemplary embodiment of the present disclosure.

For example, the mode can also be selected using the smart phone 60 including the application controlling the vehicle 1 provided therein as the communication terminal 60. As shown in FIG. 4, the application for connected vehicle service is provided on the smart phone, and the mode selected by the user may be set at the remote location through the wireless communication.

A display unit 33 provided on the vehicle 1 may be yet another example of the operation member.

Recently, for the driver's convenience and the passenger's convenience, various display units 33 are mounted in the vehicle 1. For example, various display units 33, such as the display 33 of the infotainment system for playback of a multimedia, path guide, and setting various convenience functions, and a rear seat monitor provided on the rear surface of the first row seat for the convenience of the rear seat passenger are provided, and they may be used as the operation member.

Meanwhile, among the smart keys of the vehicle 1, a smart key having a display embedded therein can also be used as the operation member. The present smart key can adjust a state of the vehicle 1 in advance according to the menu selected by the display at a location spaced from the vehicle 1, so that the mode is selected by applying the menu shown in FIG. 5 to the smart key.

Figure 6A:
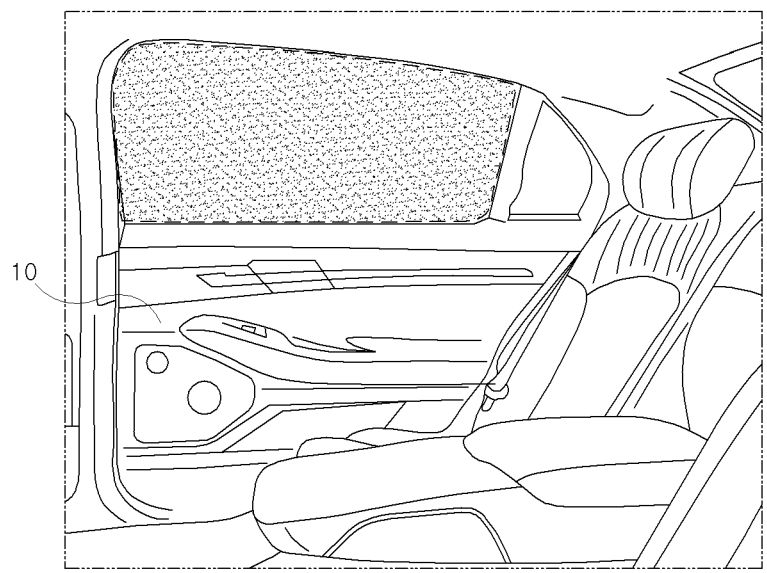
FIG. 6A is a perspective diagram showing a state where the smart glass is turned off according to the control system of the smart glass for the vehicle according to an exemplary embodiment of the present disclosure.
Figure 6B:
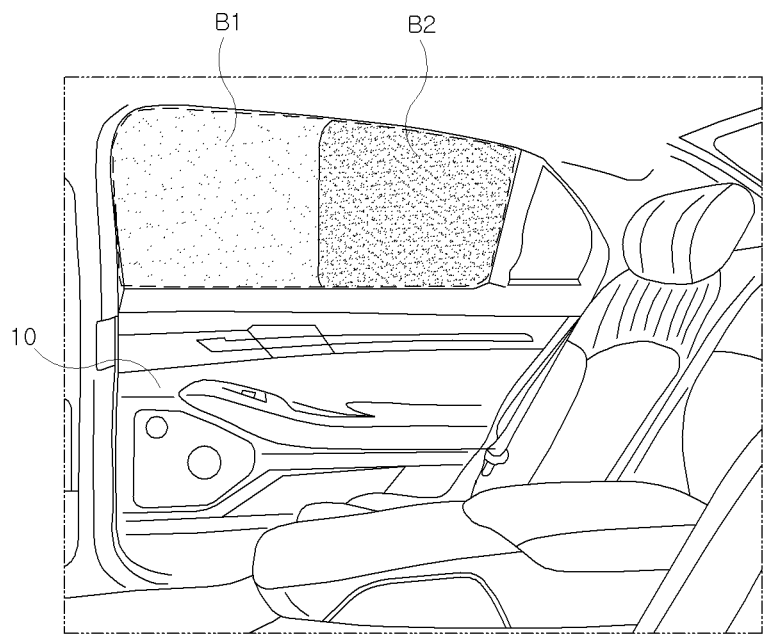
FIG. 6B is a perspective diagram showing a state where a transmittance of the smart glass is changed according to the control system of the smart glass for the vehicle according to an exemplary embodiment of the present disclosure.
Figure 6C:
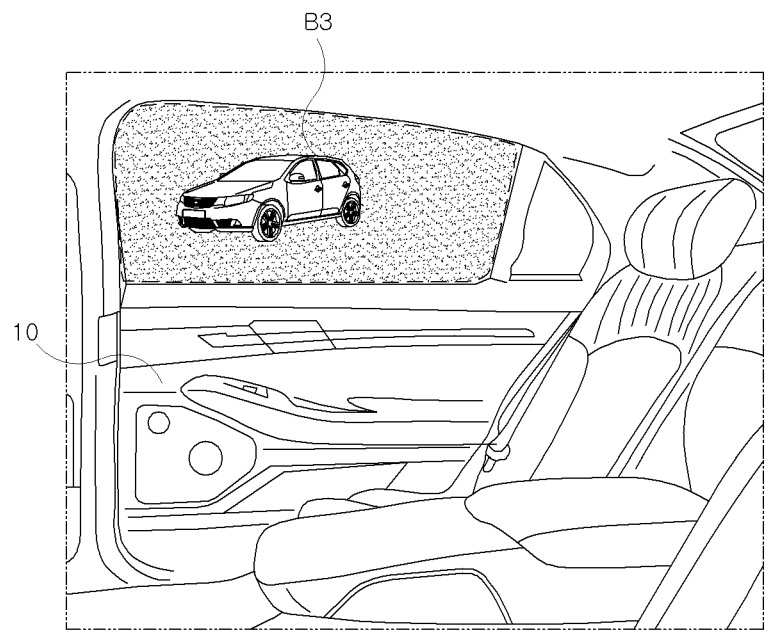
FIG. 6C, FIG. 6D, FIG. 6E and FIG. 6F are perspective diagrams showing an example of an image to be displayed on the smart glass according to the control system of the smart glass for the vehicle according to an exemplary embodiment of the present disclosure.
Figure 6D:
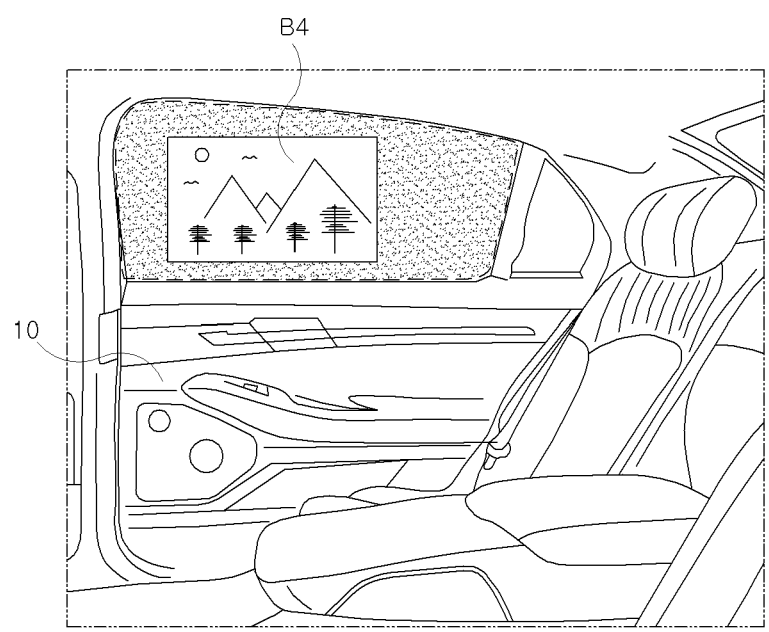
Figure 6E:
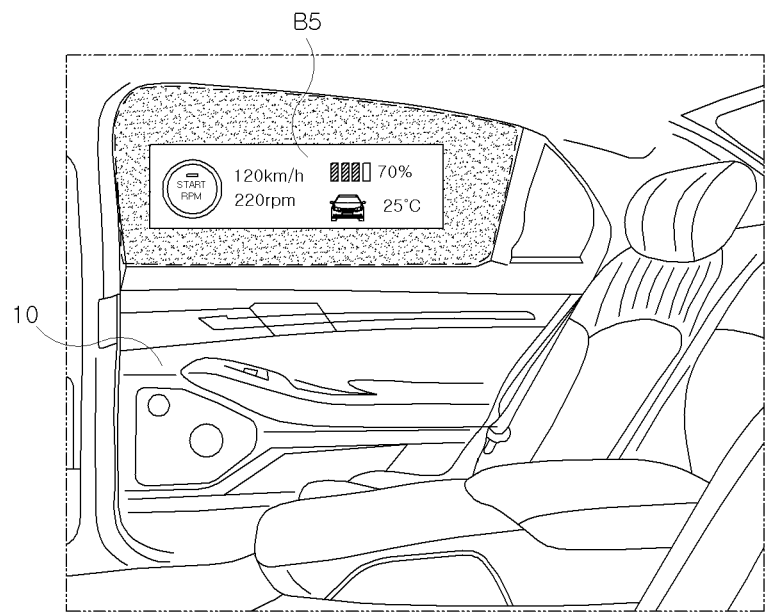
Figure 6F:
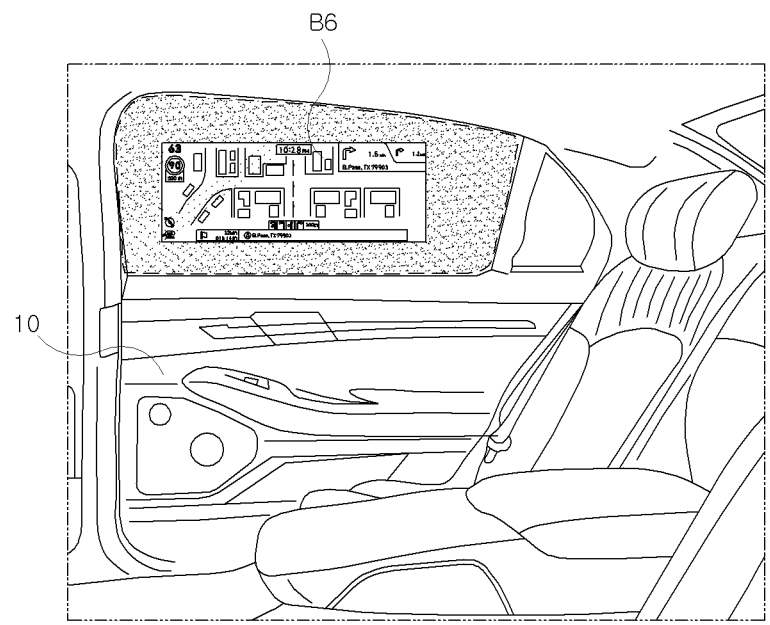
Figure 7:
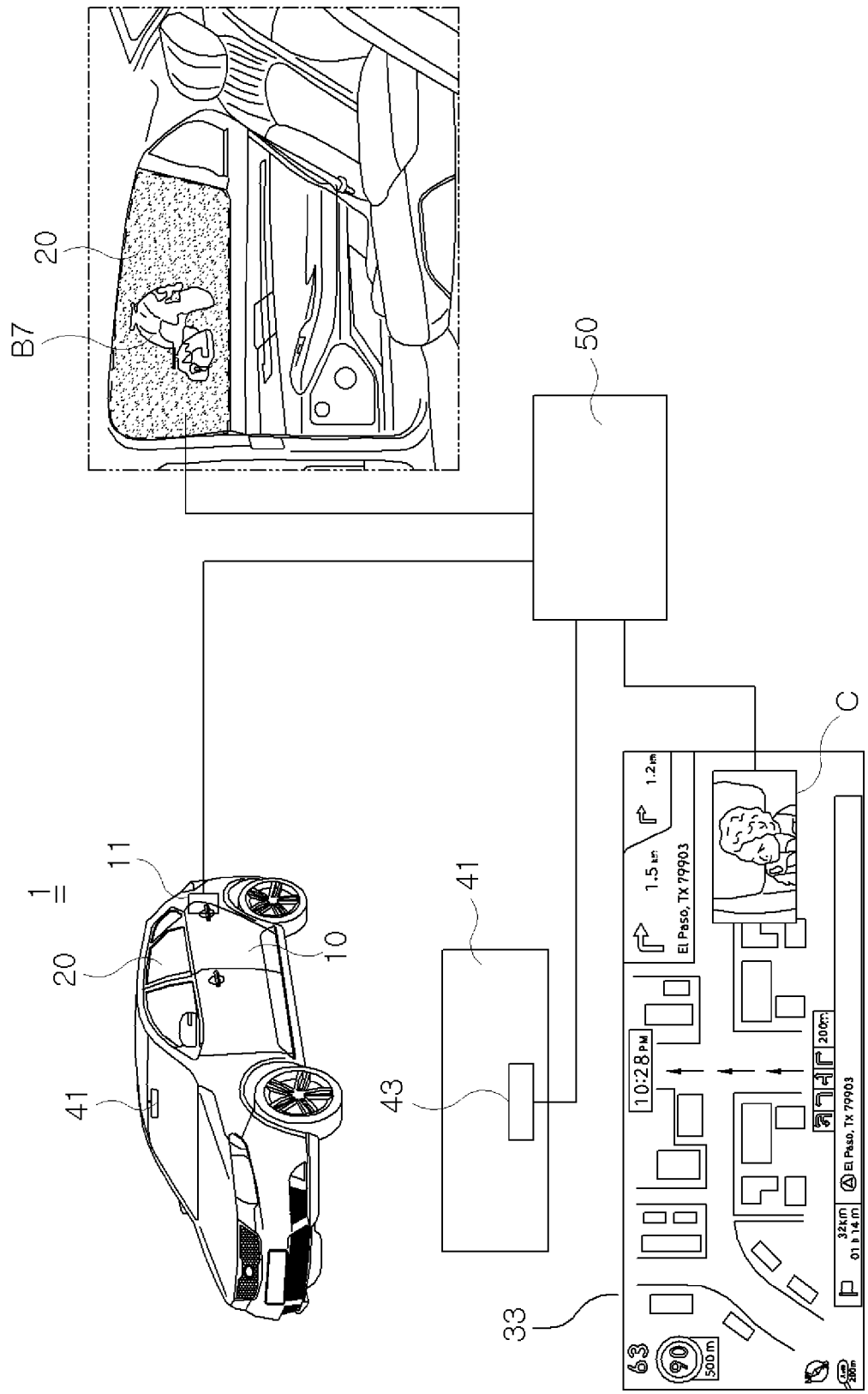
FIG. 7 is a block diagram showing a state where a kids mode is implemented according to the control system of the smart glass for the vehicle according to an exemplary embodiment of the present disclosure.

Meanwhile, the mode may be any one of an off mode to a kids mode shown in FIGS. 6A to 7. When any one of these modes is selected, and the control unit 50 controls the smart glass 20 in the selected mode.

a) Off Mode

The off mode is a mode in which the smart glass 20 is not used. In the off mode in which a power source and a control signal are not sent to the smart glass 20, the image is not displayed through the smart glass 20, and an amount of sunlight is adjusted by a unique transmittance of the smart glass 20. FIG. 6A shows a state the smart glass 20 operates as a minimum transmittance of the smart glass 20, because the smart glass 20 is not operated. In FIG. 5, it corresponds to the No. 1 menu.

b) Variable Transmittance Mode

In the variable transmittance mode, the transmittance of the smart glass 20 may be adjusted at the transmittance desired by the user.

When the user selects the mode of the smart glass 20 as the variable transmittance mode through the operation member (e.g., when selecting the No. 2 in FIG. 5), the menu that sets the variable transmittance may be provided as a specific menu thereof, and therefore, the transmittance of the smart glass 20 is adjusted to the transmittance desired by the user between a maximum transmittance and the minimum transmittance.

Meanwhile, the transmittance can also be adjusted across the entire region of the smart glass 20, but also be controlled to be differently adjusted for each region selected. For example, as shown in FIG. 6B, the transmittance is adjusted to be high transmittance in a B1 region, and the transmittance is maintained to be low transmittance in a B2 region or adjusted to be the minimum transmittance (e.g., transmittance shown in FIG. 6A). When the transmittance is different for each region, it is possible to secure the outside field of vision while protecting the passenger's privacy. Alternatively, when the transmittance in only a portion where sunlight is irradiated to the passenger's eyes is reduced and the transmittance of the rest is increased, it is possible to secure the outside field of vision while preventing glare. In addition to the above, by differing the transmittance for each region of the smart glass 20, it is possible to control the amount of sunlight through the smart glass 20 in a state of being desired by the passenger. The transmittance for each region can also be adjusted by the operation member.

Furthermore, in the variable transmittance mode, it is also possible to adjust the transmittance in a gradation form so that the transmittance is sequentially changed in a specific direction.

c) Image Mode

In the image mode, the image is displayed through the smart glass 20. In the image mode, when the user selects the image stored in the control unit 50 through the operation member, it is displayed through the smart glass 20.

In the image mode, the image previously stored when the vehicle is manufactured may be displayed. For example, the images previously store when the vehicle is manufactured, such as a logo of the vehicle manufacturer, a logo of a vehicle brand, and an image of the vehicle, are displayed through the smart glass 20. In case of selecting the No. 3 on the menu of FIG. 5, as shown in FIG. 6C, an image B3 of the vehicle may be displayed through the smart glass 20.

Meanwhile, in the image mode, the image additionally stored after the vehicle is manufactured can also be displayed. In case of selecting the No. 4 on the menu of FIG. 5, any one of the images additionally stored is displayed.

For example, a vehicle provider (rental vehicle provider, shared vehicle service provider, etc.) stores the advertisement image, the vehicle use guide phrase, etc. so that they are displayed. The vehicle provider can expect the additional profits depending upon the exposure of the advertisement image. Alternatively, when the vehicle guide phrase is displayed, the use of the vehicle is convenient and the essential guide matters may be notified of the user. As described above, the provider displays the image additionally stored to provide the contents to be delivered from the provider to the user, and therefore, the vehicle provider can obtain the additional profits according to the exposure of the advertisement, and enhance the user's convenience for vehicle guide.

Alternatively, as shown in FIG. 6D, when the image desired by the user is selected, the image is displayed. Furthermore, the user can additionally store images, and display any one of them. FIG. 6D shows an example in which a landscape image (B4) additionally stored by the user is displayed.

d) Traveling Information Mode

In the traveling information mode, the traveling information of the vehicle may be shared with the passenger on the rear seat through the smart glass 20.

FIG. 6E shows an example in which an image (B5) about the traveling information of the vehicle, such as the speed, engine RPM, a fuel amount, indoor temperature of the vehicle, is displayed on the smart glass 20 if the No. 5 is selected on the menu of FIG. 5.

Meanwhile, FIG. 6F shows an example in which an image (B6) about navigation information, such as a map, destination information, and route guide, is displayed on the smart glass 20. When the No. 6 is selected on the menu of FIG. 5, the navigation information may be shared through the smart glass 20.

e) Kids Mode

The kids mode may be selected to be operated when the passenger, such as child, who has difficulty in controlling the smart glass 20 by himself or herself gets on the rear seat. The No. 7 on the menu of FIG. 5 may be selected to enter the kids mode.

In the kids mode, the pre-stored image is displayed through the smart glass 20 while the transmittance of the smart glass 20 is adjusted. At the instant time, the transmittance may be adjusted by the driver or the passenger accommodated on the first row, and for the image displayed in the kids mode, an image (B7) about a character for child is displayed.

In the kids mode, when the kids mode is selected in conjunction with a child lock 11 of the door 10, the control unit 50 controls the child lock 11 to be operated in a locked state, preventing the door 10 from being opened by the unintended internal operation.

Furthermore, to easily monitor the child's condition accommodated on the rear seat, a camera 43 is provided in the vehicle, and the control unit 50 controls an image captured by the camera 43 to be displayed by the display unit 33 provided in the vehicle. For example, the camera 43 is additionally provided on an inside mirror 41 of the vehicle 1 to capture the rear seat, or the child accommodated on the rear seat is captured using a camera provided to capture the indoor through a black box. Thus the captured image is displayed by the display unit 33 provided in the vehicle, for example, the display 33 of the infotainment system. In other words, as shown in FIG. 7, when an appearance (C) of the child accommodated on the rear seat displayed in some regions of the navigation screen, the passenger on the first row can additionally, appropriately adjust the transmittance of the smart glass 20.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control system of a smart glass for a vehicle, the control system comprising:
    the smart glass provided on a glass of the vehicle and having a changed transmittance or an image displayed thereon;
    an operation member into which a mode of the smart glass is input; and
    a control unit electrically connected to the smart glass and the operation member and configured to adjust the transmittance of the smart glass according to the mode input into the operation member, or to control the smart glass so that the image is displayed through the smart glass, wherein the mode includes a kids mode in which a pre-stored image is displayed through the smart glass while adjusting the transmittance of the smart glass, wherein when the mode is selected as the kids mode, the control unit is further configured to operate a child lock provided on a door of the vehicle in a locking state, and wherein when the mode is selected as the kids mode, the control unit is further configured to control a camera provided in the vehicle to capture a passenger accommodated on a rear seat of the vehicle, and to display an appearance of the passenger on the rear seat captured by the camera through a display unit provided in the vehicle.

2. The control system of claim 1, wherein the mode further includes:
an off mode in which the smart glass is not operated;
a variable transmittance mode in which the transmittance of the smart glass is adjusted;
an image mode in which the pre-stored image is displayed through the smart glass; and
an traveling information mode in which traveling information of the vehicle is displayed through the smart glass.

3. The control system of claim 1,
wherein the operation member is an instrument cluster of the vehicle to which a user setting mode (USM) is applied.

4. The control system of claim 1,
wherein the operation member is a communication terminal connected to the vehicle with a connected vehicle service.

5. The control system of claim 1,
wherein the operation member is a display unit provided in the vehicle.

6. The control system of claim 1,
wherein the operation member is a smart key of the vehicle having a display embedded therein to control a state of the vehicle at a location spaced from the vehicle in the mode.

7. The control system of claim 2,
wherein in the variable transmittance mode, the transmittance is adjusted by the control unit for each region selected on the smart glass.

8. The control system of claim 2,
wherein in the variable transmittance mode, the transmittance is sequentially changed by the control unit with respect to a predetermined direction on the smart glass.

9. The control system of claim 1,
wherein the smart glass is applied to a door glass provided on the door of the vehicle.

10. The control system of claim 9,
wherein the smart glass is applied to the door glass of a rear seat door of the vehicle.

11. A method of controlling a smart glass for a vehicle, the method comprising:
receiving, by a control unit, a mode of the smart glass electrically connected to the control unit through an operation member electrically connected to the control unit, wherein the smart glass is provided on a glass of the vehicle and has a changed transmittance or an image displayed thereon; and
adjusting, by the control unit, the transmittance of the smart glass according to the mode input into the operation member, or to control the smart glass so that the image is displayed through the smart glass,
wherein the mode includes a kids mode in which a pre-stored image is displayed through the smart glass while adjusting the transmittance of the smart glass,
wherein when the mode is selected as the kids mode, the control unit is configured to operate a child lock provided on a door of the vehicle in a locking state, and
wherein when the mode is selected as the kids mode, the control unit is further configured to control a camera provided in the vehicle to capture a passenger accommodated on a rear seat of the vehicle, and to display an appearance of the passenger on the rear seat captured by the camera through a display unit provided in the vehicle.

12. The method of claim 11, wherein the mode includes:
an off mode in which the smart glass is not operated;
a variable transmittance mode in which the transmittance of the smart glass is adjusted;
an image mode in which the pre-stored image is displayed through the smart glass; and
an traveling information mode in which traveling information of the vehicle is displayed through the smart glass.

13. The method of claim 12,
wherein in the variable transmittance mode, the transmittance is adjusted by the control unit for each region selected on the smart glass.

14. The method of claim 12,
wherein in the variable transmittance mode, the transmittance is sequentially changed by the control unit with respect to a predetermined direction on the smart glass.

15. A non-transitory computer readable storage medium on which a program for performing the method of claim 11 is recorded.

* * * * *